United States Patent
Cammer

(10) Patent No.: US 7,805,839 B2
(45) Date of Patent: Oct. 5, 2010

(54) METHOD OF MANUFACTURING A TURBINE FAN BLADE

(75) Inventor: Jerald C Cammer, Sauquoit, NY (US)

(73) Assignee: Turbine Engine Components Technologies Corporation, Thomasville, GA (US)

( * ) Notice: Subject to any disclaimer, the term of this patent is extended or adjusted under 35 U.S.C. 154(b) by 241 days.

(21) Appl. No.: 11/967,484

(22) Filed: Dec. 31, 2007

(65) Prior Publication Data

US 2009/0165299 A1  Jul. 2, 2009

(51) Int. Cl.
*B21D 53/78* (2006.01)

(52) U.S. Cl. ............... 29/889.7; 29/889.71; 29/889.72; 29/889.23; 29/557

(58) Field of Classification Search .............. 29/889.71, 29/889.72, 889.23, 889.7, 557, 558; 416/232, 416/233
See application file for complete search history.

(56) References Cited

U.S. PATENT DOCUMENTS

| | | | |
|---|---|---|---|
| 2,615,236 A * | 10/1952 | Stulen et al. | 29/889.72 |
| 2,787,049 A * | 4/1957 | Stalker | 29/889.721 |
| 3,045,967 A * | 7/1962 | Clarke et al. | 416/232 |
| 3,057,393 A * | 10/1962 | Clarke | 72/373 |
| 3,762,835 A | 10/1973 | Carlson et al. | |
| 3,936,920 A | 2/1976 | Conn, Jr. | |
| 4,006,999 A | 2/1977 | Brantley et al. | |
| 5,141,400 A | 8/1992 | Murphy et al. | |
| 5,330,093 A | 7/1994 | Bottomley et al. | |
| 5,375,978 A | 12/1994 | Evans et al. | |
| 5,694,683 A * | 12/1997 | Teets et al. | 29/889.721 |
| 5,711,068 A | 1/1998 | Salt | |
| 5,791,879 A | 8/1998 | Fitzgerald et al. | |
| 5,876,651 A | 3/1999 | Blackburn, Jr. et al. | |
| 5,965,240 A | 10/1999 | Blackburn et al. | |
| 6,132,857 A | 10/2000 | Champenois et al. | |
| 6,467,168 B2 | 10/2002 | Wallis | |
| 6,471,485 B1 * | 10/2002 | Rossmann et al. | 416/230 |
| 6,607,358 B2 | 8/2003 | Finn et al. | |
| 7,025,568 B2 | 4/2006 | Jones | |
| 7,033,131 B2 | 4/2006 | Schreiber | |
| 7,156,622 B2 | 1/2007 | Schreiber | |
| 2001/0029668 A1 * | 10/2001 | Schreiber | 29/889.7 |
| 2005/0278950 A1 * | 12/2005 | Despreaux et al. | 29/889.71 |
| 2006/0275132 A1 | 12/2006 | McMillan | |

OTHER PUBLICATIONS

International Search Report for corresponding PCT Application (PCT/US08/88517), 2 pages, Dated Aug. 12, 2009.

* cited by examiner

*Primary Examiner*—David P Bryant
*Assistant Examiner*—Jacob J Cigna
(74) *Attorney, Agent, or Firm*—Jones Day

(57) ABSTRACT

A metal leading edge of a turbine fan blade is manufactured by cutting and shaping an elongated metal part. The metal part has front and rear edges extending lengthwise of the part, and has a generally wedge-shaped transverse cross-section with opposite sides diverging from the front edge toward the rear edge. A cavity is cut inward from the rear edge toward the front edge. This provides the part with a generally V-shaped transverse cross-section having opposite side walls diverging rearwardly from the front edge. A mandrel is inserted into the cavity, and the side walls of the V-shaped part are deflected toward each other to constrict the cavity into the configuration of the mandrel. The part is then mounted as a metal leading edge by inserting a turbine fan blade component into the constricted cavity and fastening the part to the component.

14 Claims, 5 Drawing Sheets

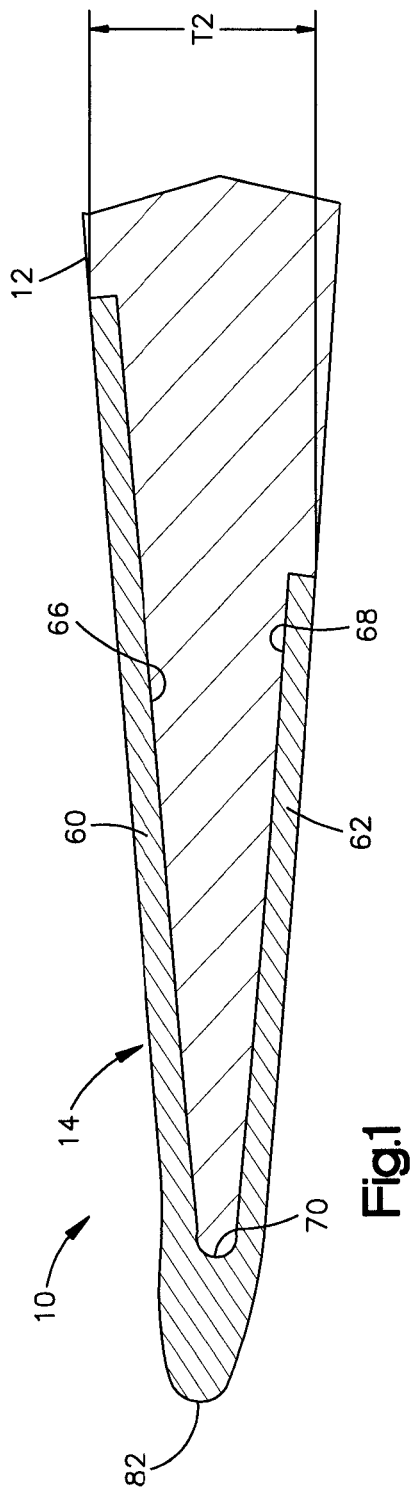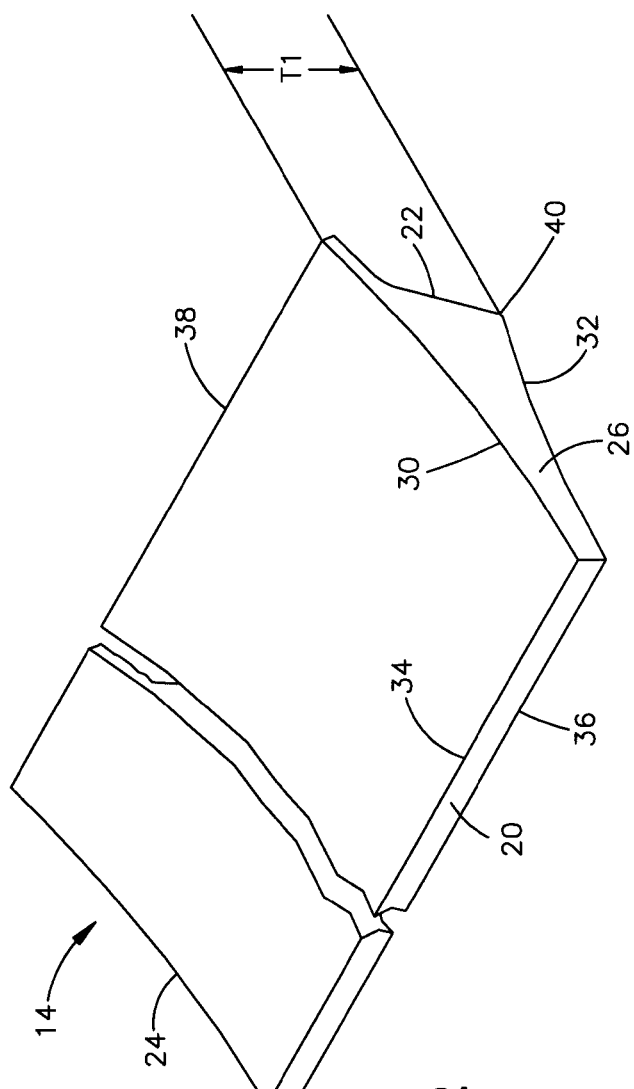

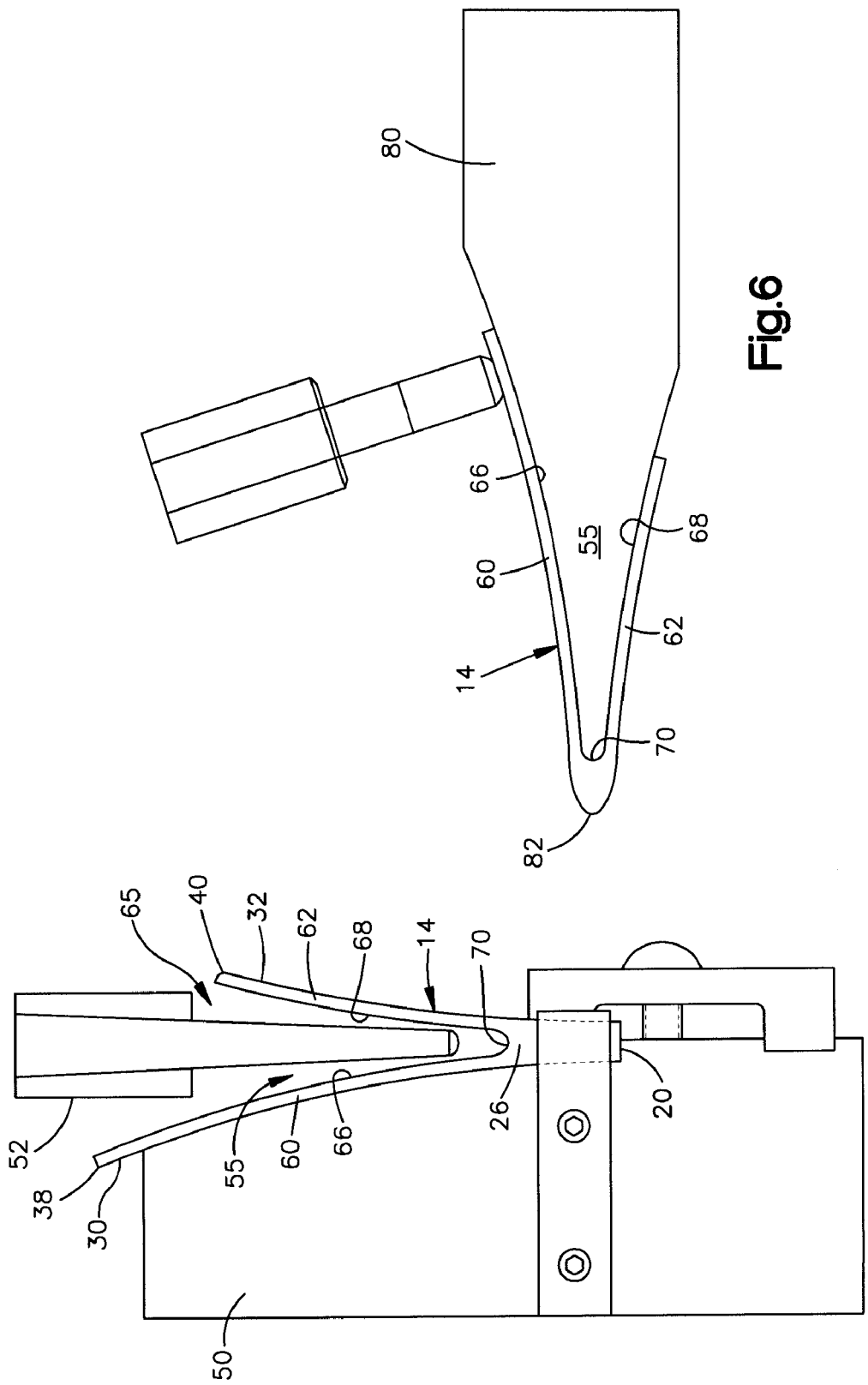

METHOD OF MANUFACTURING A TURBINE FAN BLADE

TECHNICAL FIELD

This technology relates to a fan blade for a turbine in an aircraft engine.

BACKGROUND

A jet engine for an aircraft has a turbine with fan blades that draw air into the engine as the turbine rotates. The fan blades are exposed to the atmosphere in front of the engine and have the potential for an impact with a bird or other foreign object that may be drawn into the engine. For this reason a turbine fan blade typically has a metal leading edge for structural reinforcement to protect the fan blade from a bird strike or the like.

SUMMARY

A metal leading edge of a turbine fan blade is manufactured by cutting and shaping an elongated metal part. The metal part has front and rear edges extending lengthwise of the part, and has a generally wedge-shaped transverse cross-section with opposite sides diverging from the front edge toward the rear edge. A cavity is cut inward from the rear edge toward the front edge. This provides the part with a generally V-shaped transverse cross-section with opposite side walls diverging rearwardly from the front edge. A mandrel is inserted into the cavity, and the side walls of the V-shaped part are deflected toward each other to constrict the cavity into the configuration of the mandrel. The part is then installed as a metal leading edge by inserting a turbine fan blade component into the constricted cavity and fastening the part to the component.

BRIEF DESCRIPTION OF THE DRAWINGS

FIG. 1 is a schematic view showing parts of a turbine fan blade in cross-section.

FIG. 2 is a schematic perspective view showing an initial condition of a part of the fan blade of FIG. 1.

FIG. 5 is a schematic view illustrating a cutting step that places the part in the intermediate condition of FIG. 3.

FIG. 6 is a schematic view illustrating a cutting and surface finishing step.

DETAILED DESCRIPTION

Figure 4:
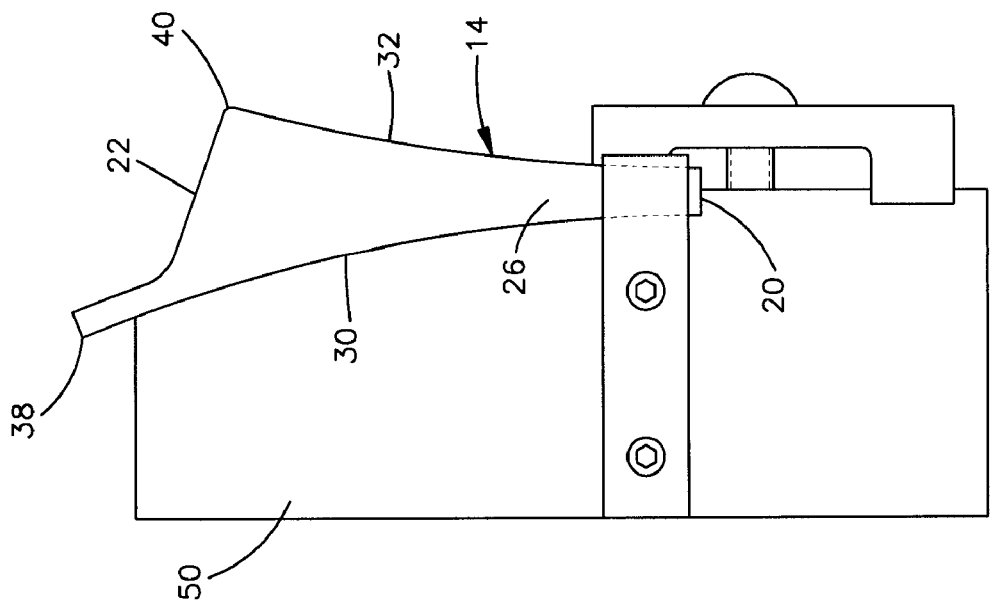
FIG. 4 is a schematic view showing the part of FIG. 2 clamped to a cutting fixture.

The apparatus shown in the drawings has parts that are examples of the elements recited in the claims. The following description thus includes examples of how a person of ordinary skill in the art can make and use the claimed invention. It is presented here to meet the statutory requirements of written description, enablement, and best mode without imposing limitations that are not recited in the claims.

As shown partially in FIG. 1, a turbine fan blade 10 has a body 12 component formed of a composite material. A metal part 14 is mounted on a leading portion 16 of the body component 12 to define the leading edge of the fan blade 10. Although the body component 12 is shown schematically as a single piece of composite material, it may comprise any suitable part or combination of parts that together provide the fan blade 10 with the overall configuration of an airfoil. The metal part 14, which is preferably formed of titanium, provides the fan blade 10 with structural reinforcement for protection against bird strikes.

The metal part 14 is initially formed as a forged metal strip having the elongated, generally rectangular configuration shown in FIG. 2. The part 14 then has front and rear edges 20 and 22 extending lengthwise between its opposite ends 24 and 26. Although the part 14 will vary along its length to conform with the airfoil configuration of the body component 12 (FIG. 1), it maintains a generally wedge-shaped transverse cross-section with opposite sides 30 and 32 diverging from the front edge 20 toward the rear edge 22 as shown, for example, at the second end 26 in FIG. 2.

In the illustrated example the opposite sides 30 and 32 have concave contours, and the first side 30 is longer than the second side 32. The front edge 20 is a planar surface that is orthogonal to the opposite sides 30 and 32 at front corners 34 and 36 of the part 14. The rear edge 22 has a non-planar contour extending between a rear corner 38 at the longer side 30 and a rear corner 40 at shorter side 32. Importantly, the initial thickness T1 of the part 14 at the rear edge 22 is substantially greater than the thickness T2 of the fan blade 10 (FIG. 1) where the finished part 14 reaches over the leading portion 16 of the body component 12.

Figure 3:
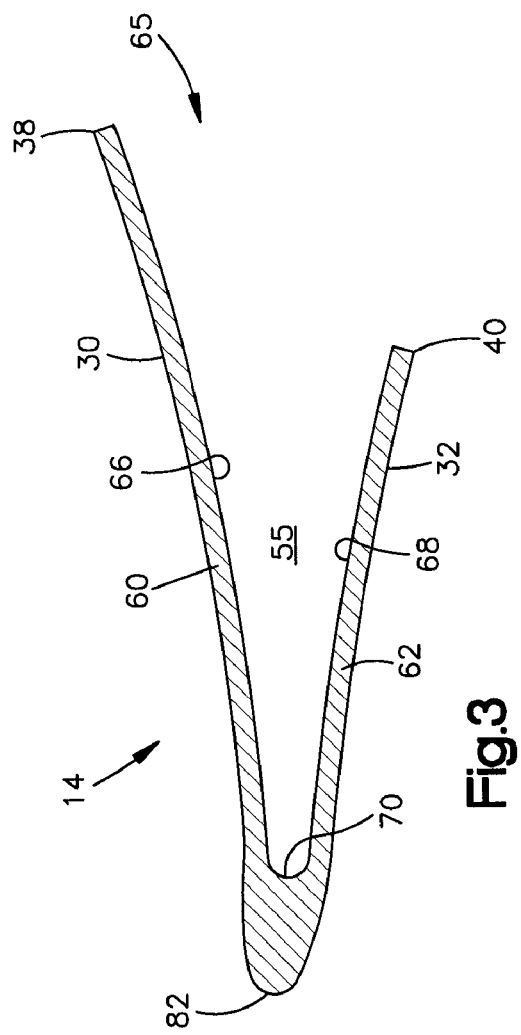
FIG. 3 is a schematic sectional view showing an intermediate condition of the part shown in FIG. 2.

The metal part 14 of FIG. 2 obtains the configuration of FIG. 3 in a machining process. Specifically, the part 14 is clamped to a machining fixture 50 as shown in FIG. 4, and is cut with a milling cutter 52 as shown in FIG. 5. The cutter 52, or one or more similar cutters of differing sizes, cuts into the part 14 to form a cavity 55. The cavity 55 extends lengthwise of the part 14 from end 24 to end 26, and extends transversely inward from the rear edge 22 toward the front edge 20. This provides the entire length of the part 14 with a generally V-shaped transverse cross-section having opposite side walls 60 and 62 that diverge to the rear. Like the wedge-shaped cross-section of FIG. 2, the V-shaped cross-section of FIG. 3 will vary as needed for conformity with the airfoil configuration of the body component 12. However, the oversized thickness T1 at the rear of the part 14 enables the cavity 55 to have a correspondingly wide open end 65 along its full length. Additionally, the concave contours at the opposite sides 30 and 32 enable the cutter 52 to provide the side walls 60 and 62 with correspondingly convex inner surfaces 66 and 68. The wide opening 65 and convex inner surfaces 66 and 68 enhance the clearance through which the cutter 52 can be maneuvered within the cavity 55 as it advances inward from the rear edge 22 toward the front edge 20.

In addition to the convex inner side surfaces 66 and 68, the cutter 52 forms a concave inner surface 70 at the bottom of the cavity 55. The inner surfaces 66, 68 and 70 are all provided with machined finishes. The part 14 is next transferred to a cutting mandrel 80 for machine finishing at the exterior surfaces, as shown in FIG. 6. Cutting at the exterior also provides the part 14 with a newly formed front edge 82 having a rounded contour suitable for the terminal leading edge of the fan blade 10 (FIG. 1).

Figure 7:
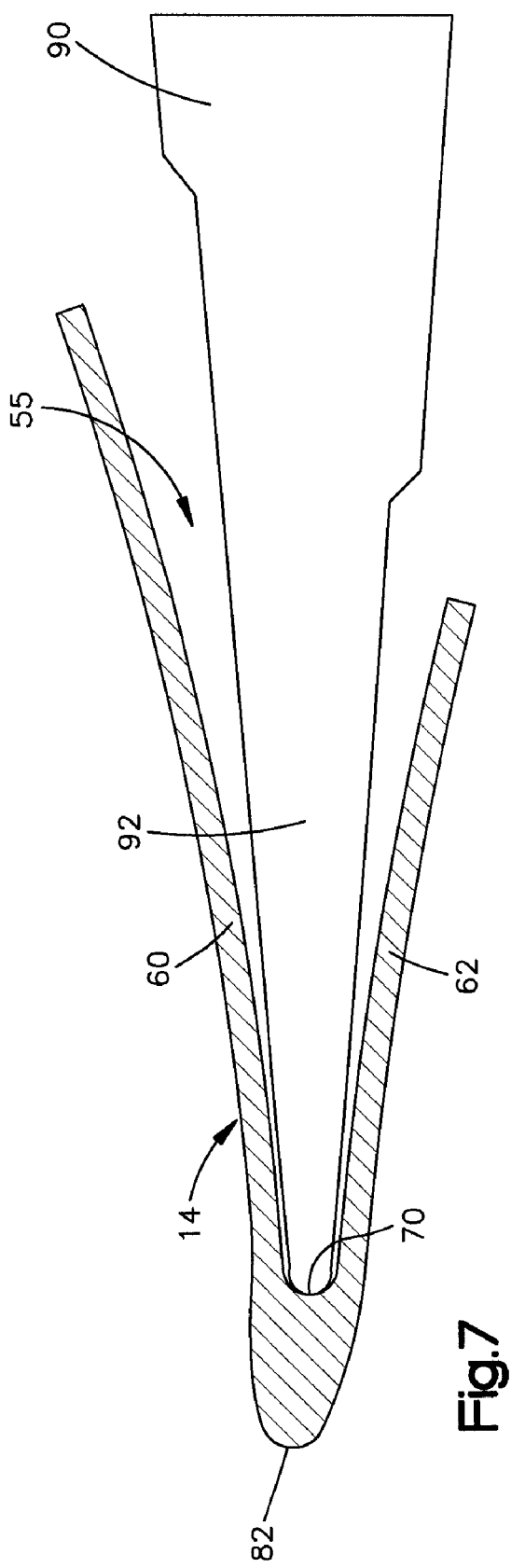
FIG. 7 is a schematic view partially illustrating a shaping step.
Figure 9:
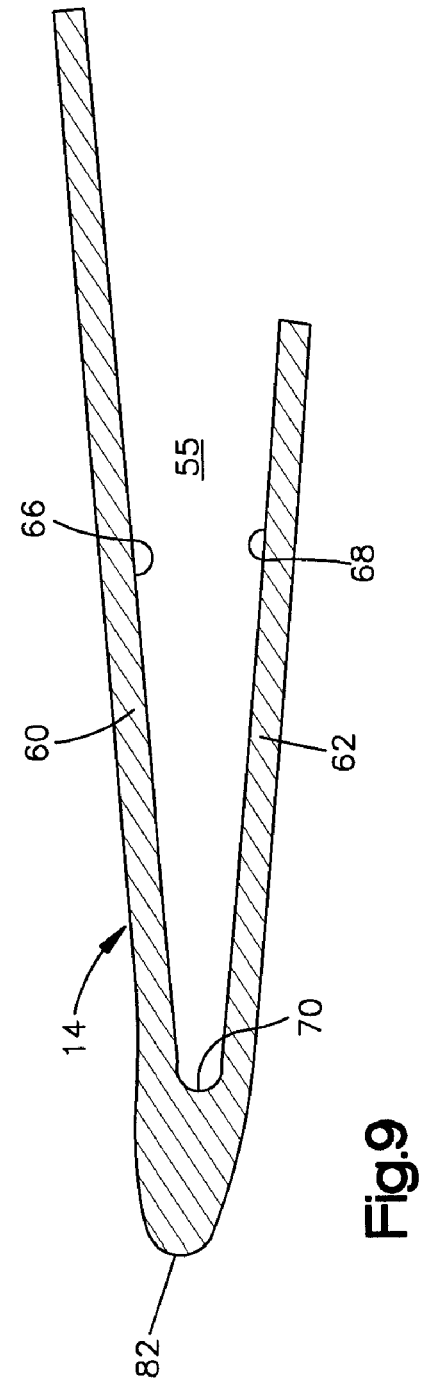
FIG. 9 is a schematic sectional view showing the part in a finished condition.
Figure 8:
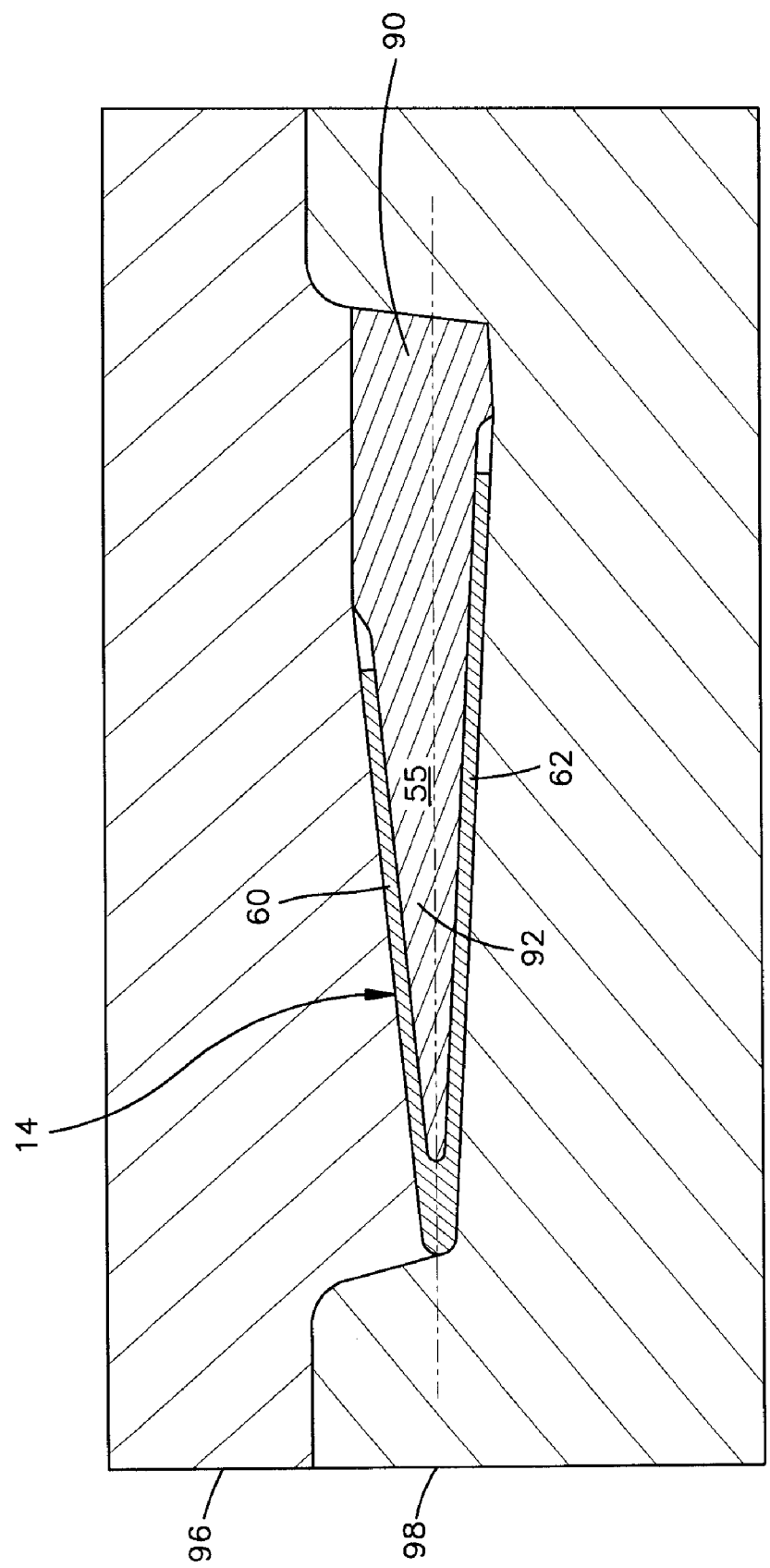
FIG. 8 also is a schematic view partially illustrating the shaping step.

A shaping step follows the cutting steps. As shown in FIG. 7, the part 14 is placed on a shaping mandrel 90 such that a leading portion 92 of the mandrel 90 is received in the open cavity 55. The leading portion 92 of the mandrel 90 has the same size and shape as the leading portion 16 of the body 12 component upon which the metal part 14 is to be mounted as shown in FIG. 1. The part 14 and the mandrel 90 are heated to an elevated temperature and placed between a pair of heated forming dies 96 and 98, as shown in FIG. 8. As the dies 96 and 98 are moved together, they deflect the side walls 60 and 62 of the part toward each other and into overlying engagement with the leading portion 92 of the mandrel 90. This constricts the cavity 55 into the configuration of the leading portion 92 of the mandrel 90 and, likewise, the leading portion 16 of the body component 12. Such shaping of the part 14 is preferably accomplished in a creep forming or warm forming process at an elevated temperature that is maintained below the forging temperature of the titanium or other metal of which the part 14 is formed. The part 14 is then removed from the forming dies 96 and 98 and the mandrel 90, and is cooled to room temperature. The cooled and shaped part 14, as shown in FIG. 9, is then mounted on the body component 12 without further heating, cutting or shaping, and is fastened to the body component 12 in any suitable manner known in the art.

The patentable scope of the invention is defined by the claims, and may include other examples of how the invention can be made and used. Such other examples, which may be available either before or after the application filing date, are intended to be within the scope of the claims if they have elements that do not differ from the literal language of the claims, or if they have equivalent elements with insubstantial differences from the literal language of the claims.

The invention claimed is:

1. A method of manufacturing a metal leading edge of a turbine fan blade, comprising:
   providing an elongated metal part having a front edge extending lengthwise of the part, a rear edge extending lengthwise of the part, and a generally wedge-shaped transverse cross-section with opposite sides diverging from the front edge toward the rear edge;
   cutting a cavity inward from the rear edge toward the front edge to provide the part with a generally V-shaped transverse cross-section having opposite side walls diverging rearwardly;
   shaping the part by inserting a mandrel into the cavity and deflecting the side walls toward each other to constrict the cavity into the configuration of the mandrel; and
   mounting the part as a metal leading edge by inserting a turbine fan blade component into the constricted cavity and fastening the part to the component.

2. A method as defined in claim 1 wherein the mounting step is performed without further shaping of the part after the cavity is constricted into the configuration of the mandrel.

3. A method as defined in claim 1 wherein the opposite sides of the wedge-shaped cross-section have concave contours.

4. A method as defined in claim 1 wherein the cutting step provides each side wall with a convex inner surface contour.

5. A method as defined in claim 1 further comprising the step of providing exterior surfaces of the part with machined finishes prior to the shaping step.

6. A method as defined in claim 1 further comprising the step of machining the part to provide a front edge with a rounded corner suitable as a terminal leading edge of the fan blade prior to the shaping step.

7. A method of manufacturing a metal leading edge of a turbine fan blade, comprising:
   providing an elongated metal part having opposite ends, a front edge extending lengthwise of the part, a rear edge extending lengthwise of the part, and a generally wedge-shaped transverse cross-section with opposite sides diverging from the front edge toward the rear edge;
   cutting a cavity in the part extending lengthwise end to end and transversely inward from the rear edge toward the front edge to provide the entire length of the part with a generally V-shaped transverse cross-section having opposite side walls diverging rearwardly from the front edge;
   inserting a mandrel into the cavity;
   shaping the part by heating the part to an elevated temperature and deflecting the side walls of the heated part toward each other to constrict the cavity into the configuration of the mandrel; and
   mounting the part as a metal leading edge without further shaping at an elevated temperature by inserting a turbine fan blade component into the constricted cavity and fastening the part to the component.

8. A method as defined in claim 7 wherein the cutting step provides each side wall with a convex inner surface contour.

9. A method as defined in claim 7 further comprising the step of providing exterior surfaces of the part with machined finishes prior to the shaping step.

10. A method as defined in claim 7 further comprising the step of machining the part to provide a front edge with a rounded corner suitable as a terminal leading edge of the fan blade prior to the shaping step.

11. A method of manufacturing a metal leading edge of a turbine fan blade, comprising:
   providing an elongated metal part having a front edge extending lengthwise of the part and a rear edge extending lengthwise of the part;
   cutting a cavity inward from the rear edge toward the front edge to provide the part with a concave inner surface defining the bottom of the cavity and opposed inner side surfaces with convex contours reaching fully from the concave inner surface to the rear edge of the part;
   shaping the part by inserting a mandrel into the cavity and deflecting the opposed inner side surfaces toward each other to constrict the cavity into the configuration of the mandrel; and
   mounting the part as a metal leading edge by inserting a turbine fan blade component into the constricted cavity and fastening the part to the component.

12. A method as defined in claim 11 wherein the mounting step is performed without further shaping of the part after the cavity is constricted into the configuration of the mandrel.

13. A method as defined in claim 11 further comprising the step of providing exterior surfaces of the part with machined finishes prior to the shaping step.

14. A method as defined in claim 11 further comprising the step of machining the part to provide a front edge with a rounded corner suitable as a terminal leading edge of the fan blade prior to the shaping step.

* * * * *